March 4, 1969 P. E. ASHLEY ET AL 3,430,276

TORSION BAR SUSPENSION FOR RATE GYROSCOPES

Filed June 17, 1966

INVENTORS
PAUL E. ASHLEY
CLAIR G. SUTTER
BY
S. C. Geaton
ATTORNEY 3,430,276
TORSION BAR SUSPENSION FOR RATE
GYROSCOPES
Paul E. Ashley and Clair G. Sutter, Phoenix, Ariz., assignors to Sperry Rand Corporation, a corporation of Delaware
Filed June 17, 1966, Ser. No. 558,333
U.S. Cl. 74—5                    4 Claims
Int. Cl. G01c 19/24

ABSTRACT OF THE DISCLOSURE

A suspension for the rotor bearing frame of a rate gyroscope of the torsion rod type having an elongated tubular member closely overlying substantially the entire length of the torsion rod for limiting or restraining radial movements of the rotor bearing frame of the gyroscope under excessive shock loads.

---

The present invention relates generally to gyroscopic devices and, in particular, to rate gyroscopes having but a single precision axis. More specifically, the present invention relates to a torsion bar suspension arrangement for such rate gyroscopes. While the invention is illustrated herein as being applied to a rate gyroscope of the non-floated type, it will of course be understood that the invention in its broader aspects is equally applicable to floated gyros.

In single-degree-of-freedom gyroscopes normally used for providing measures of angular rates of rotation of the body upon which the gyroscope is mounted, it is desirable to provide a carefully controlled resilient restraint about the gyro precessed axis while at the same time minimizing any frictional restraint about that axis. Also, since normally the angular movement in repsonse to the rates being measured is extremely small, a reduction in the number of conventional ball bearings is desirable since it has been found that bearing failures due to wear or fretting under vibration conditions, for example, lead to an early deterioration of such ball bearings. Therefore, it has been conventional practice for some time to use torsionally resilient suspension means on the output axis of rate gyros which provide not only the resilient restraint but also the desired frictionless support. In rate gyroscopes it is usual practice to provide some form of signal generating device for measuring the angular displacement of the gyro rotor bearing frame with respect to the instrument housing. Many such signal generators are of the variable reluctance type and hence involve an air gap which should be maintained fairly constant in order to maintain good linearity of the signal produced thereby. However, it has been found that while the torsion bar suspension provides the proper angular restraint and also supports normal radial loads on the rotor bearing frame, there are conditions under which the torsion bar is not of sufficient lateral or radial stiffness as to maintain the pickoff air gap substantially with proper limits. For example, when the rate gyroscope is mounted in an aircraft, high g maneuvers and/or high g vibrations, may occur in which the normal radial support capability of the torsion rod is exceeded. Also, handling during shipping and installation may require the gyro to withstand high g shock loads.

In accordance with the teachings of the present invention, lateral movements of the rotor bearing frame are minimized by means of a rigid elongated tubular member closely surrounding the torsion rods and having one end thereof fixedly secured to one end of the torsion rod suspension, which member extends over substantially the entire length of the torsion bar and particularly over the torsionally resilient portion of the torsion bar, the clearance between the torsion bar and the tubular member being on the order of only a few thousandths of an inch. by this means, should the rotor bearing frame be subjected to high g loads, the elongated tubular member supplements the torsion bar to thereby limit any resulting radial movements of the rotor bearing frame relative to the suspension axis.

It is therefore a primary object of the present invention to provide a suspension for the rotor bearing frame of a rate gyroscope of the torsion rod type having an elongated tubular member overlying substantially the entire length of the torsion rod whereby to limit or restrain radial movements of the rotor bearing frame of the gyroscope under excessive shock loads.

It is a further object of the present invention to provide a torsion rod suspension for rate gyros of the above character in which the torsion rod includes a weakened portion for providing the desired torsional restraint and an auxiliary rigid tubular member surrounding the rod and extending over substantially the entire weakened portion of the torsion rod, the inner diameter of the tubular member clearing the diameter of the shaft by an amount on the order of from a few thousandths to a few ten thousandths of an inch.

Other objects and features of the present invention will become more clearly apparent as a description of a preferred embodiment thereof proceeds, reference being made to the accompanying drawings wherein.

Figure 1:
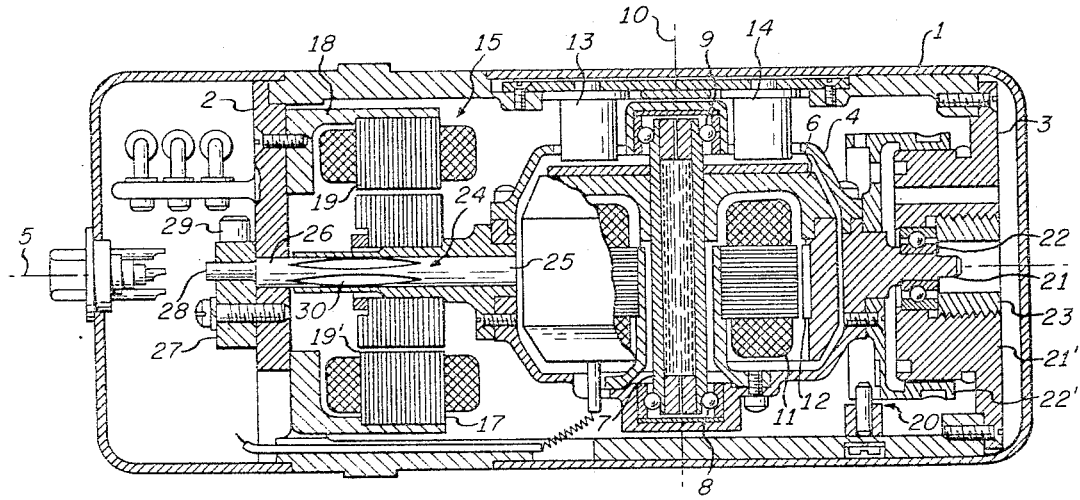
FIG. 1 is a longitudinal cross-sectional view of a rate gyroscope constructed in accordance with the teaching of the present invention.

Referring now to FIG. 1, a rate gyroscope generally of conventional form is illustrated and comprises a substantially cylindrical housing 1 having spaced end walls 2 and 3 in which the rotor bearing frame or gimbal 4 is supported for limited angular rotation about a precession or output axis 5. The rotor bearing frame 4 includes a rotor 6 mounted on a shaft 7 which in turn is supported for high speed rotation in suitable ball bearings 8 and 9 about a spin axis 10. The rotor may be driven by a suitable electric motor such as a hysteresis motor including a stator and field winding assembly 11 secured to the rotor bearing frame 4, which cooperates in driving relation with a hysteresis ring 12 mounted on the rotor 6. The rotor bearings 8 and 9 may be provided with a suitable self-lubrication arrangement as shown. Cooperable with the rotor 6 is a pair of self-test coils 13 and 14 fixedly secured to the gyro housing 1 and are provided for the purpose of testing the gyro rotor speed and pickoff signal prior to or during its use, as disclosed in U.S. Patent No. 3,186,211 which is also assigned to the assignee as the present invention.

An electrical output proportional to the rate of turn being sensed by the gyro is generated by a suitable electrical signal generator generally indicated at 15. This signal generator may comprise a stator and winding assembly 17 fixed with respect to the housing 1 as by means of a support ring 18 secured to the end wall 2 having a cylindrical bore, and an inductively coupled rotor part 19 within the bore rigidly secured to rotor bearing frame 4 whereby a gap 19' is defined. It is important that this gap be maintained as uniform as possible under operating conditions. It has been found that with conventional torsion rod suspension, high g loading on the rotor bearing frame 4 adversely affects the signal output from the pickoff. However, as will be described, the present invention serves to maintain a substantially uniform air gap whereby to maintain good signal linearity.

Rotary motion of the rotor bearing frame 4 about the precession or output axis 5 is limited to a very small angle by means of a pin and stop arrangement indicated at 20 in FIG. 1. Damping of the rotor bearing frame 4 is accomplished by means of a viscous-shear-type damper which comprises a fixed cylindrical hub portion 21' forming a part of or secured to the end wall 3 of the housing and a very closely fitting cylindrical member 22' rigidly secured to rotor bearing frame 4, the space between the cylindrical surfaces of 21' and 22' being partially or completely filled with a viscous fluid such as, for example, a silicone fluid.

The rotor bearing frame 4 is mounted in the housing 1 for rotation about the output axis 5 by means of a conventional ball bearing mount on one end thereof and a torsion rod suspension on the other end thereof. However, it will be understood that the torsion bar suspension of the present invention may be employed at both ends of the instrument. As illustrated in FIG. 1, the end of the rotor bearing frame adjacent the damper includes a trunnion 21 journalled by suitable ball bearing means 22 in the end wall 3 of the gyro housing, suitable clamping nut 23 being provided for securing the bearing race in place in the housing end wall.

Figure 2:
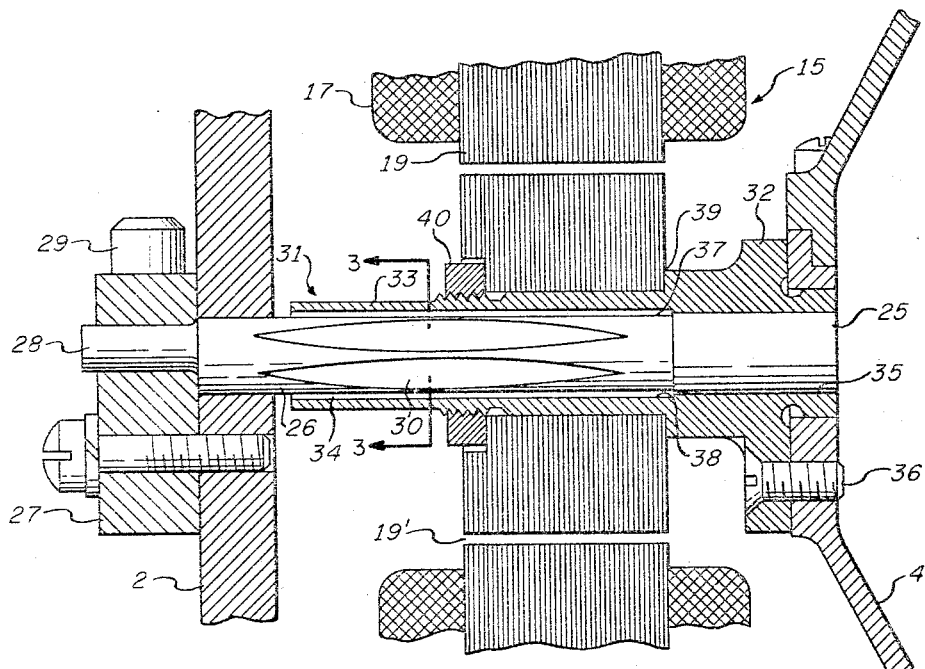
FIG. 2 illustrates an enlarged view of the torsion bar suspension portion of the gyro illustrated in FIG. 1.
Figure 3:
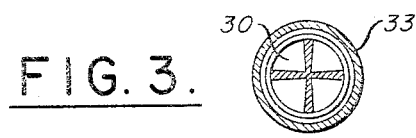
FIG. 3 is a cross-section view of the torsion bar assembly taken along line 3—3 of FIG. 2.

In accordance with the teachings of the present invention, the torsion bar suspension for the end of the rotor bearing frame 4 adjacent pickoff 15 comprises a torsion bar 24 having one end 25 fixedly secured in the rotor bearing frame 4 and the other end 26 fixedly secured in the housing end wall 2. The latter arrangement comprises a block 27 screw fastened to the end wall 2 and adapted to receive a flattened end portion 28 of the torsion rod 24, the latter being rigidly clamped in the block by means of the suitable clamping screw 29. The torsion rod 24 includes a portion 30 that has been weakened as by suitable machining; for example, to provide a cruciformed section as illustrated in more detail in FIGS. 2 and 3, such machining serving to provide the desired torsional flexibility to the rod 4 over the zone of the shaft so weakened.

It has been found that while the weakened portion 30 of the torsion rod 24 provides the desired torsional resiliency, it may not provide the necessary lateral rigidity to support the rotor bearing frame 4 under lateral high $g$ loads acting on the rotor bearing frame. Such loading may occur during high speed maneuvers of the vehicle on which the gyro is mounted, under high acceleration loads produced by vehicle movement and/or by rough handling during shipping and installation.

Therefore, in accordance with the teachings of the present invention, a rigid elongated tubular member 31 is employed to provide supplemental lateral support for the rotor bearing frame 4 under such high $g$ loading conditions. This member in the illustrated embodiment of the present invention has one of its ends 32 rigidly secured at the end 25 of the torsion rod 24 as by means of a force fit and to the rotor bearing frame 4 as by means of a flanged portion secured to gimbal 4 as by screws 36. The tubular member 31 extends from the gimbal 4 toward the housing end wall 2 and terminates just short of this wall to thereby provide a rigid beam between gimbal 4 and the housing. The tubular portion 33 of member 31 surrounds the torsion rod 24 and substantially completely overlies the torsionally resilient portion 30 of the rod 24, the space 34 therebetween, i.e., the clearance, being on the order of a few thousandths to a few ten thousandths of an inch.

In the illustrated embodiment of the invention, the tubular shaft 33 is enlarged as at 32 to form a mounting flange and the torsion rod 25 is force fitted within a bore 35 of the member 31. Approximately one third of the torsion rod 25 and tubular member 32 function as a single or integral rigid assembly so that lateral flexure will occur only over the remaining two thirds of the bar. This two thirds of the torsion rod 24 is slightly reduced in diameter from the diameter of end portion 25, as at 37, while the internal bore of tubular member 31 is slightly increased in diameter from the diameter of bore 35, as at 38, thereby providing the desired small clearance between the torsion rod and tubular support member.

Also, in accordance with the teachings of the present invention, the rotor 19 of pickoff 15 is rigidly secured to the tubular member 31 by means of a shoulder 39 on member 31 and a clamping nut 40. Thus, the pickoff rotor is mounted on a substantially rigid member and independently of the torsion bar 31.

In one embodiment of the present invention, the overall size of the gyro is about 3¾ inches in length by about 1½ inches in diameter; the free length of the torsion bar is approximately .737 inch, the length of the tubular member overlying this portion of the bar is .530 inch and the clearance 34 therebetween is on the order of .0024 inch. The cruciform portion 30, i.e., the zone of minimum torsional and lateral rigidity, extends over a distance of approximately .20 inch and the sleeve 33 extends completely over this zone. Of course, these dimensions are merely illustrative and can and will vary depending upon the over-all size of the gyroscope, the degree of torsional resiliency and lateral rigidity desired, the environment in which the gyro is used, and many other factors which will be known to those familiar with this art.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. A gyroscopic instrument having an instrument housing, a rotor, a rotor bearing frame for supporting said rotor for rotation about a spin axis, and suspension means for supporting said rotor bearing frame in said housing for limited rotation about a precession axis at right angles to said spin axis, said last means including:

(a) an elongated shaft member extending along said precession axis having one end thereof fixedly secured in a wall of said housing and the other end fixedly secured to said frame, said shaft member including a torsionally resilient portion whereby to permit limited rotational movement of said rotor bearing frame relative to said housing, and (b) a rigid elongated tubular member having one end thereof fixedly secured at one of the ends of said resilient member and including a portion closely overlaying substantially the entire torsionally resilient portion of said shaft, the clearance between the interior surface of said tubular member of the exterior surface of said torsionally resilient portion being on the order of a few thousandths of an inch, whereby to limit radial movements of said bearing frame relative to said precession axis produced by radial loads acting on said rotor bearing frame while permitting limited rotational freedom about said axis.

2. The gyroscopic instrument as set forth in claim 1 wherein said rigid tubular member has its one end rigidly secured to said rotor bearing frame and its other end extending toward and terminating closely adjacent said housing wall.

3. The gyroscopic instrument as set forth in claim 2 further including pickoff means having a stator means fixed to said housing and a rotor means fixed to said tubular member and defining a radial air gap therebetween whereby the maximum air gap is limited to within the limits imposed by the clearance between said shaft and tubular member.

4. The gyroscopic instrument as set forth in claim 1 wherein said torsionally resilient member comprises a solid shaft having portions thereof cut away to form a mechanically weakened zone whereby to impart torsional flexibility to said shaft, and wherein said rigid tubular member substantially completely covers said weakened zone, the inner diameter of said tubular member clearing said shaft by an amount on the order of from a few thousandths to a few ten thousandths of an inch.

References Cited

UNITED STATES PATENTS

| | | | |
|---|---|---|---|
| 2,851,886 | 9/1958 | Kuipers | 74—5.5 |
| 2,909,064 | 10/1959 | Schoeppel et al. | 74—5 |
| 2,955,471 | 10/1960 | Schwartz et al. | 74—5.5 |
| 2,955,472 | 10/1960 | Krupick et al. | 74—5.5 |
| 3,252,337 | 5/1966 | Degener. | |

FOREIGN PATENTS 794,236  4/1958  Great Britain.

C. J. HUSAR, *Primary Examiner.*

U.S. Cl. X.R.

74—5.5